Aug. 10, 1937.                V. F. HAMMEL                2,089,791
              METHOD OF MAKING ELECTRICAL INSULATORS
                    Filed Aug. 31, 1934    3 Sheets-Sheet 1
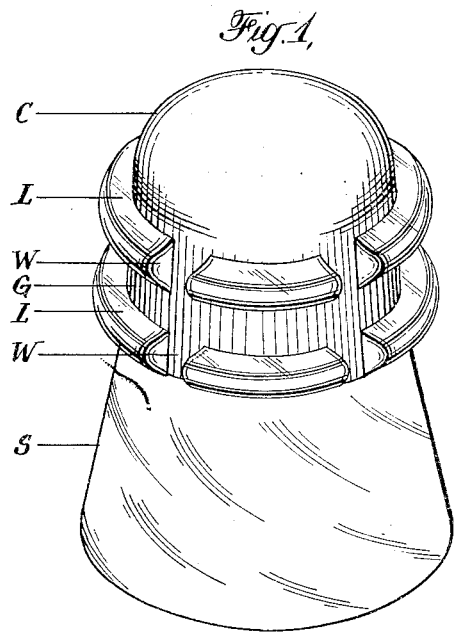
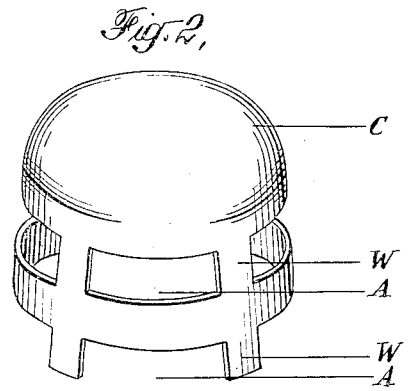
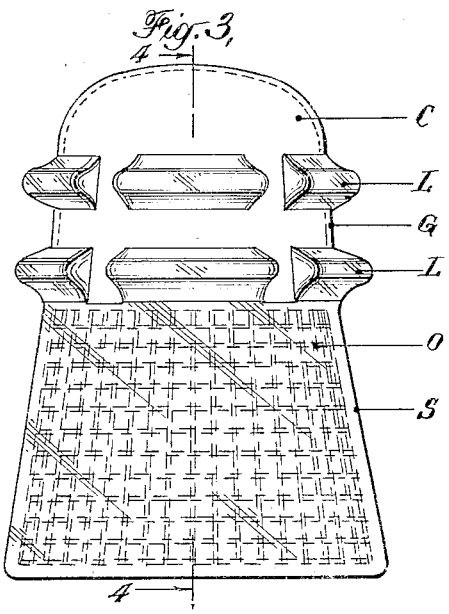
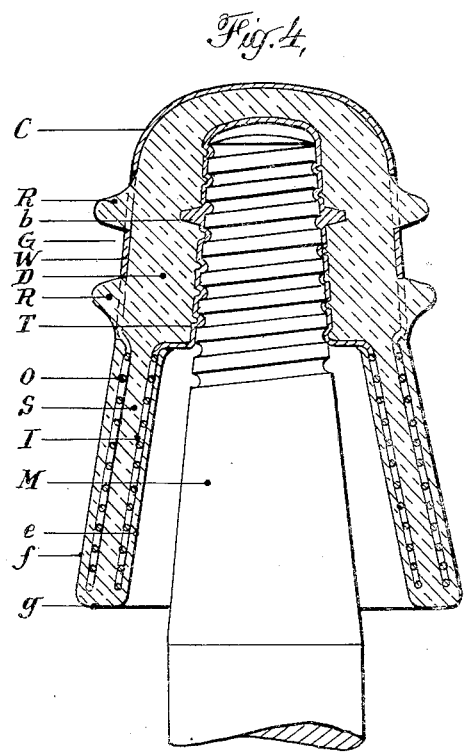
INVENTOR
Victor F. Hammel
BY
ATTORNEYS

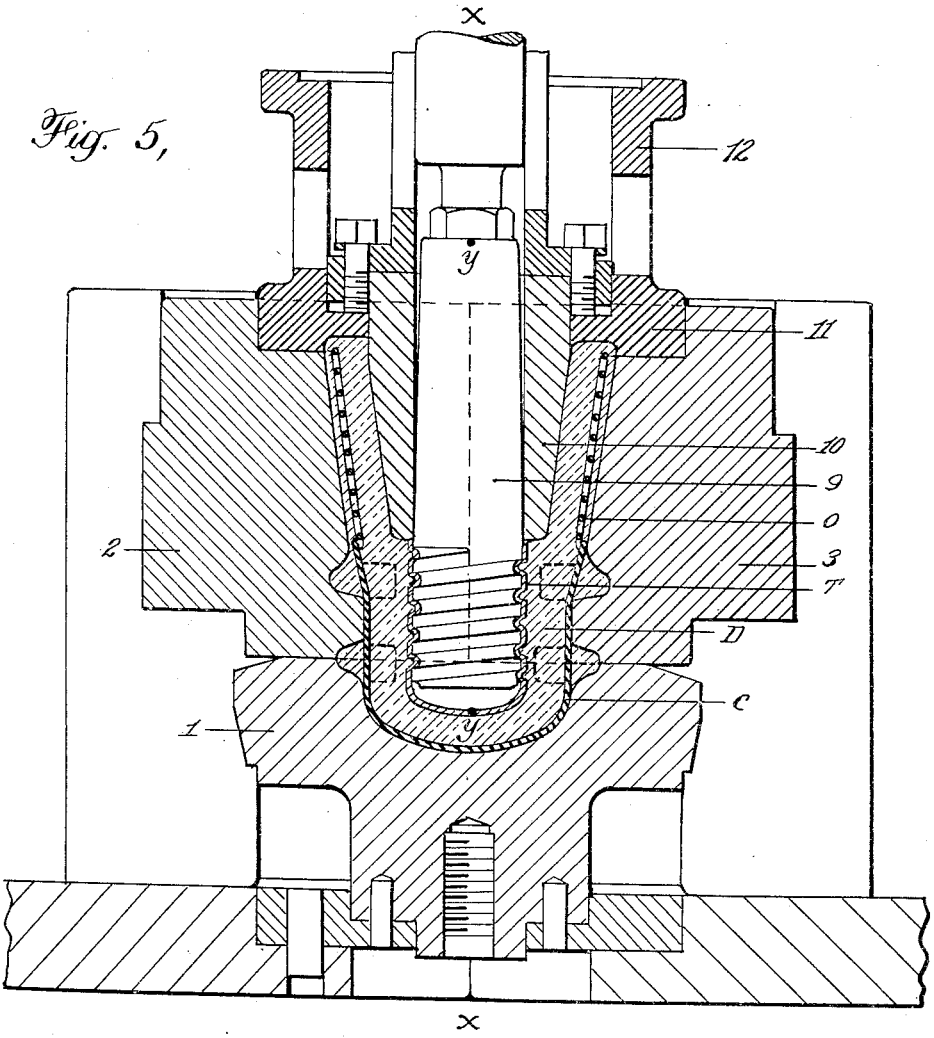

Aug. 10, 1937.   V. F. HAMMEL   2,089,791
METHOD OF MAKING ELECTRICAL INSULATORS
Filed Aug. 31, 1934   3 Sheets-Sheet 3
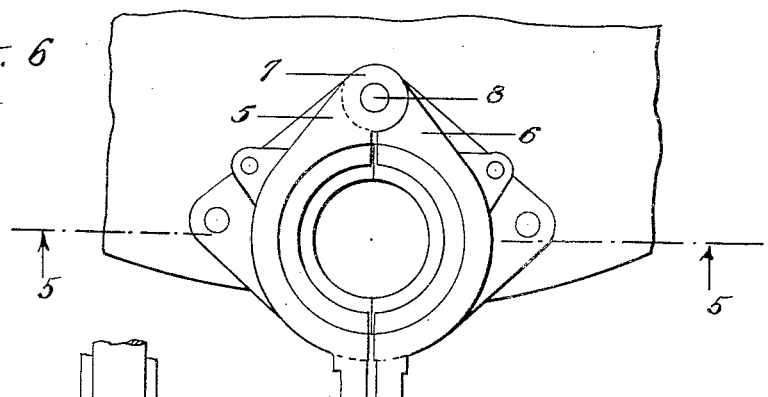
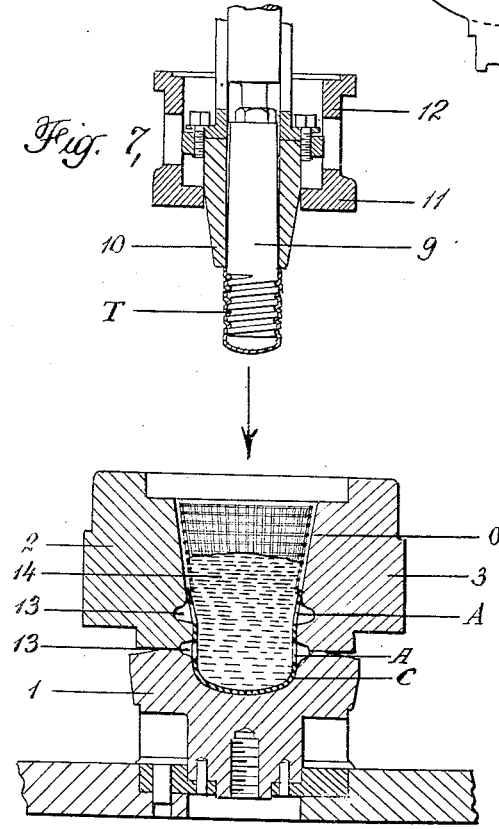
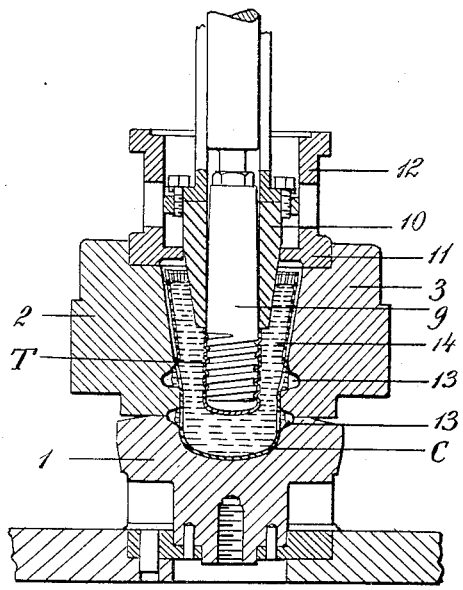
INVENTOR
Victor F. Hammel
BY
ATTORNEYS Patented Aug. 10, 1937

2,089,791

UNITED STATES PATENT OFFICE 2,089,791

METHOD OF MAKING ELECTRICAL INSULATORS

Victor F. Hammel, Richmond Hill, N. Y.

Application August 31, 1934, Serial No. 742,313

4 Claims. (Cl. 49—81)

This invention relates to improvements in electrical insulators and to methods for making them. The principles of construction herein described are of especial utility as applied to insulators for supporting overhead conductors of power and telephone lines.

An object of the invention is to provide electrical insulators which are metallically strengthened externally or internally or both externally and internally with accompanying improvements in performance including: reduction of power losses in the insulators particularly at high or "carrier" frequencies, elimination of factors productive of radio interference, and minimization of arcing and breakdown.

Construction of insulators such as are herein described has necessitated the formulation of manufacturing methods believed original. It is a primary object to explain and encompass these novel processes.

Power line installations have in the past utilized insulators of a type consisting exclusively of a dielectric shell, sometimes internally threaded for mounting on a cross arm pin, and provided with a grooved head for securing the line conductor by means of a tie wire. Extensive tests have demonstrated this construction to be a prolific source of radio disturbance. The relatively slight area of intimate contact between the line conductor, the tie wire and the insulator on the one hand, and between the insulator and the cross arm pin on the other, gives rise to excessive electrostatic potential gradients which produce ionization within the small air gaps existing between and adjacent the several elements thus mechanically joined.

As the voltage wave rises to its peak each half-cycle, this ionization increases until a miniature arc is produced. The electrical constants of the system are generally such that the accompanying transient electrical discharge is of damped oscillatory character and usually inclusive of frequencies within a relatively wide high frequency band observable as static in radio receivers. Atmospheric ionization initiated by these minute intermittent discharges, has a tendency to spread, particularly in inclement or foggy weather, and to establish a permanent corona surrounding the insulator inducing flashovers of short circuit magnitude between the line and the insulator support.

A number of proposals have been advanced for overcoming these tendencies. It has been suggested to coat the insulator adjacent the line conductor with a thin covering of a conductive medium such as metallic paint thereby to minimize electrostatic flux concentration by virtue of this potential equalizing surface. This expedient is open to the criticism that the coating soon wears away, initially in spots with resulting localized ionization and gap discharges between spots. With the coating entirely eroded the insulator is reduced to an exclusively dielectric shell subject to the defects noted.

Another proposal has been to surmount the dielectric shell of the insulator with a metallic cap or bushing for attaching the line conductor, and sometimes to provide additionally a metallic insulator support attached to the dielectric. While the known constructions of this character tend toward overcoming certain of the mentioned disadvantages, the practical expedients resorted to for affixing the metallic cap and support to the dielectric shell have militated against success.

Thus for eliminating the troublesome air gaps referred to, it has been proposed to cement the metallic cap and line conductor supports to the insulator, or to bolt the components together and fill the unavoidably resulting air gaps with an insulating compound such as asphalt emulsion. The efficacy of both these expedients is destroyed by mechanical shock to which the insulator is subjected in service, due, for example, to pole vibration or line swinging during storms. The cement tends to crack and break loose while the compound is simply squeezed out of the gaps. The cement, moreover, usually has dielectric properties different from those of the insulator proper, and this together with unavoidable jagged or sharp edges thereof requisite to adhesion, unduly concentrates the electrostatic flux at focal points inducing dielectric failure.

The novel constructions and processes of this invention inherently eliminate the above and like defects of known arrangements and methods of attachment by providing an insulator wherein metallic supports or strengthening and potential equalizing members are embedded, at least in part, directly in the dielectric medium while in a plastic state in process of formation. Thus in the finished insulators of this invention the metallic members are permanently locked in intimate contact with the dielectric thereby avoiding the necessity for temporary palliatives, such as the cementing of parts or the use of filler compounds to eliminate air gaps.

A form of insulator embodying this construction and incorporating certain features of this invention comprises a skirted dielectric shell surmounted by a metal cap apertured or slotted to provide spaced webs through and between which the dielectric medium is extruded in a plastic state to form protuberant lobes permanently affixing the cap to the shell. A slightly modified construction is that in which the dielectric extrusions are shaped confluently about the webs to provide continuous ribs peripherally surrounding and engaging the cap. With either arrangement, a metallic thimble, bushing or the like is preferably disposed within the shell in spaced relation to the cap and embedded in part directly in the dielectric.

The cap being in metallic contact with the line conductor serves to apply the line potential uniformly to a relatively large area of the dielectric, thereby to prevent excessive electrostatic flux concentration and arcing. Similarly the metallic insulator support or thimble, being grounded, will apply ground potential to all portions of the insulator dielectric in contact therewith. The insulator becomes thus in effect an electrostatic condenser of relatively large area throughout which the electrostatic flux distribution is reasonably uniform and of relatively low density and across which the potential gradient from the line conductor to the insulator mounting is fairly constant and representative of the average. Since a large portion of the dielectric is thus about equally stressed, the insulator functions with high effectiveness in resisting breakdown due to excessive line potentials.

Equalization of the electrostatic flux distribution and potential gradient may likewise be secured in the dielectric skirt of the insulator by embedding therein one or more metallic webs or screens permeating the skirt. One such screen embedded adjacent the outer surface of the skirt and conductively joined to the cap not only improves the electrical characteristics of the insulator along the lines explained, but in addition greatly strengthens the skirt mechanically. Substantially complete electrical equalization may, however, be secured by embedding a second screen in the skirt adjacent its inner surface and in spaced relation to the first, the inner screen being conductively joined to the metallic insulator mounting or bushing These screens must of necessity be completely embedded in the skirt in order to maintain a leakage path of high resistance over the surface of the skirt and between the line conductor and the grounded insulator support. Otherwise flashover and short circuiting would be induced with relative ease.

Referring now to the drawings:

Figs. 1–4 inclusive illustrate an insulator in accordance with the invention wherein a slotted metallic cap surmounts a skirted dielectric shell protuberantly extruded in part through the cap slots to provide spaced lobes permanently affixing the cap to the shell. These figures also depict the optional inclusion of outer and inner webs or screens completely embedded in and permeating the skirt and connected respectively to the cap and to a metallic thimble or bushing disposed within the skirt and embedded in part in the dielectric for mounting the insulator.

Fig. 1 is a perspective view of the complete insulator; Fig. 2 a perspective of the metallic cap; Fig. 3 a side elevation of the complete insulator; and Fig. 4 a section along 4—4 of Fig. 3.

Figs. 5 to 8 inclusive illustrate the manner in which the novel process of the present invention for making insulators may be practiced by employment of an apertured mold and associated core member. Fig. 5 is a sectional elevation along 5—5 of Fig. 6, of the mold with the core member in situ for forming the finished insulator. Fig. 6 is a plan view of the mold. Figs. 7 and 8 are sectional elevations similar to Fig. 5, but with the core member shown in certain positions of elevation with respect to the mold aperture assumed in the process of insulator formation.

Referring to Figs. 1–4 inclusive, the insulator comprises a dielectric shell D of bell shaped configuration terminating in a skirt S. This shell may be of a suitable vitreous medium, such as glass.

Surmounting the shell D is a metallic cap C peripherally apertured or slotted, as at A, to provide spaced webs W, through and between which the dielectric medium of shell D, is extruded to provide spaced protuberant lobes L permanently locking the cap and shell in intimate contact, and conjointly forming a peripheral groove G for attaching a line conductor and tie wire.

For removably mounting the insulator upon a pin M, preferably of metal, an internally threaded metallic bushing, thimble, or the like T, is disposed within the shell D in spaced relation to cap C, and permanently embedded in part in the dielectric medium as shown. The embedded portion may include lugs, such as $b$, to prevent movement of the thimble T with respect to shell D.

The positive engagement of the metallic members C and T with the dielectric shell D, supplemented preferably by a choice of a sufficiently pliable metal or one having a coefficient of thermal expansion equal to that of the dielectric, will assure the permanent elimination of small air gaps between the dielectric and metallic members, thereby preventing arcing such as is productive of radio interference in the manner explained. Moreover, the metallic contact between the line conductor, tie wire and cap C will result in a uniform application of the line potential to the entire external area of the dielectric shell encompassed by the cap. Similarly, the thimble T will maintain all portions of the dielectric in contact therewith at the ground potential of pin M. Cap C, thimble T and the interposed portion of the shell D, thus constitute, as stated, an electrostatic condenser of relatively large plate area throughout which the electrostatic flux distribution is reasonably uniform and across which the potential gradient from the line conductor to the pin is fairly constant and representative of the average gradient.

As employed on high frequency or carrier current communication lines, the capacity formed by the metal cap, thimble and interposed dielectric, by-passes around the surface leakage path $e, f, g$ of the skirt S, a portion of the high frequency current flowing from the line conductor to the pin. The portion thus by-passed represents "wattless" or non-dissipated signaling energy. The capacity thus formed reduces surface leakage losses to the extent that it by-passes the signaling currents around the leakage path.

This capacity may be further increased and the leakage losses correspondingly further reduced by the addition of outer and inner metallic webs or screens O and I wholly embedded in and permeating the skirt S and conductively joined to the cap C and thimble T respectively as shown. Screens O and I must of necessity be completely embedded in the skirt in order to maintain a long leakage path e, f, g, and thus a high degree of insulation between the line conductor and the pin M.

The novel method employing a mold and cooperating core for making insulators embodying the features above described, will now be explained with reference to Figs. 5 to 8 inclusive.

As shown more particularly in Figs. 5 and 6, the mold comprises a bottom plug 1 and sides 2 and 3. The sides are housed in castings 5 and 6, provided with apertured lugs, such as 7, cooperating with a bolt 8 to form a hinged support whereby the sides may be swung open laterally.

The sides and bottom plug of the mold define the outer contour of the finished insulator D, which as illustrated in Fig. 5, is that of Figs. 1–4 inclusive although it will be understood that a similar mold appropriately modified as to shape is equally applicable for making insulators embodying any of the other features referred to above.

The mold is open at the top for reception of a core consisting of a stem 9 rotatable within a petticoat 10, the latter in turn slidingly engaging a mold closure or sealing ring 11 affixed to a housing 12. In the position shown in Fig. 5, the stem, petticoat, and sealing ring define the inner contour of the finished insulator.

Preliminary to making an insulator, the stem, petticoat and sealing ring are vertically withdrawn from the mold aperture as illustrated in Fig. 7. The metal bushing or thimble T is screwed onto the stem 9 as thus elevated. Also the metal insulator cap C with its attached outer screen O, if the latter is desired in the finished insulator, is dropped or otherwise inserted in the mold aperture as is likewise shown in Fig. 7. If the finished insulator is to incorporate spaced lobes L, such for example as those of Fig. 1, the cap C must be so placed in the mold that the cap apertures A are aligned with the mold concavities 13 which produce lobes L of the insulator. This precaution is not required in the production of insulators provided only with continuous peripheral ribs.

A properly regulated charge of the dielectric medium 14 in a fused state is next introduced at the mold aperture within the cap and screen. The mold aperture is then closed by downward displacement as a unit of the stem 9, petticoat 10, and sealing ring 11, the stem and petticoat being slightly elevated relative to the sealing ring, Fig. 8, from their ultimate relative positions in forming the insulator, Fig. 5. This is done to assure that the sealing ring will be tightly seated in the mold prior to substantial deformation of the plastic charge by the stem 9 and petticoat 10, as is illustrated in Fig. 8.

With the sealing ring in the position shown in Fig. 8, the downward displacement of the stem and petticoat continues in consequence of which pressure is exerted on the plastic charge 14 thereby to extrude the dielectric through the cap and screen apertures to the mold. As the pressure increases the extrusions are shaped by the mold confluently about the screen webs to form an unbroken outer dielectric surface and embed the screen wholly within the skirt. Depending on the shape of the mold concavities 13, the extrusions through the cap apertures will be formed into spaced protuberant lobes L as in the construction of Fig. 1, or shaped confluently about webs to provide continuous dielectric ribs R surrounding the cap.

The ultimate vertical displacement of the stem and petticoat is as illustrated in Fig. 5 serving thereby in conjunction with the mold and sealing ring to shape the insulator in its finished form. While thus retained, the dielectric medium is cooled and hardened sufficiently to retain its shape. Thereupon the stem 9 is withdrawn from engagement with the thimble or bushing T leaving the latter embedded in the dielectric medium. The petticoat 10 and sealing ring 11 are vertically withdrawn and the mold walls 2, 3 swung open to expose the finished insulator for removal.

I claim:

1. The method of making an electrical insulator comprising a dielectric shell of glass with an outer metal cap having slots therein and a threaded metal thimble embedded within the glass shell with said shell extending beyond said cap and thimble to form an insulating glass skirt, said method comprising placing the cap within a mold with its outer surface fitting against the bottom of the mold and with the slots thereof in alignment with corresponding concavities provided in said mold, temporarily capping the threaded thimble upon a plunger, depositing a charge of molten glass within the mold and cap, and pressing the plunger with the thimble attached into said charge, said mold and plunger cooperating thereby simultaneously to shape said glass shell including said skirt, to force some of the charge through the cap slots into said mold concavities thereby to form shaped glass protuberances, and to force some of the charge into firm contact with the inner surface of the cap and with the outer surface of the thimble, allowing the glass to set, and withdrawing the plunger leaving the thimble firmly and permanently embedded in the glass, whereby in a single pressing operation the glass shell is formed integral with the cap and thimble.

2. The method of making an electrical insulator comprising a dielectric shell of glass having an outer metal cap and a threaded metal thimble within the shell, said shell extending beyond said cap and thimble to form an insulating glass skirt, said method comprising: placing the cap within a mold with its outer surface fitting against the bottom of the mold, temporarily capping a plunger with said thimble, depositing a charge of molten glass within the mold and cap, and pressing the plunger with the thimble attached into said charge, said mold and plunger cooperating thereby to force some of the charge into firm contact with the inner surface of the cap and with the outer surface of the thimble while shaping said shell including said glass skirt, allowing the glass to set and withdrawing the plunger leaving the thimble embedded, whereby in a single pressing operation the glass shell is formed integral with the cap and thimble.

3. The method of making an electrical insulator comprising a skirted dielectric shell of glass having an outer metal cap, a metal web wholly embedded in the skirt, and a metal thimble within the shell, which comprises: permanently securing the metal web to the cap in the form of a skirt, placing the cap within a mold with its outer surface fitting against the mold and with the web thereby spaced wholly away from the mold, temporarily capping a plunger with said thimble, depositing a plastic charge of molten glass within the web and cap, and pressing the plunger with the thimble attached into said charge, said mold and plunger cooperating thereby simultaneously to force some of the plastic charge into firm contact with the inner surface of the cap and with the outer surface of the thimble and some of the charge through and about the web to the mold while shaping the glass shell, allowing the glass to set and withdrawing the plunger leaving the thimble permanently and firmly embedded in the glass, whereby in a single pressing operation the glass shell is formed integral with the cap, thimble and embedded web.

4. The method of making a skirted glass insulator with a threaded metal thimble, which comprises: introducing a charge of molten glass within a mold; temporarily capping a plunger with a thin-walled metal thimble of material capable of remaining in air-tight contact with the glass upon thermal expansion and contraction thereof and which will not fracture the glass, said thimble having internal and corresponding external threads on the annular wall substantially throughout the extent thereof, said plunger substantially throughout the extent of the thimble closely engaging the innermost portion of the threads substantially throughout the extent thereof; pressing the plunger with the thimble attached into said molten glass thereby simultaneously shaping said charge while pressing some of said charge into firm and continuous contact with the outer surface of said thimble including said outer threaded portion; allowing the glass to set while thus firmly pressed against the thimble; and withdrawing the plunger leaving the thimble permanently and immovably embedded and anchored directly in the glass and in direct and continuous contact therewith, whereby the insulator is formed complete in a single pressing operation.

VICTOR F. HAMMEL.

CERTIFICATE OF CORRECTION.

Patent No. 2,089,791.　　　　　　　　　　　　　　　August 10, 1937.

VICTOR F. HAMMEL.

It is hereby certified that error appears in the printed specification of the above numbered patent requiring correction as follows: Page 4, second column, lines 3 and 4, claim 4, strike out the words "substantially throughout the extent of the thimble"; and that the said Letters Patent should be read with this correction therein that the same may conform to the record of the case in the Patent Office.

Signed and sealed this 26th day of October, A. D. 1937.

(Seal)

Henry Van Arsdale,
Acting Commissioner of Patents.